US011908273B2

(12) United States Patent
Verschoor et al.

(10) Patent No.: US 11,908,273 B2
(45) Date of Patent: Feb. 20, 2024

(54) PLAYING CARD WITH ELECTRONIC AUTHENTICATOR

(71) Applicant: SEAL NETWORK B.V., Amsterdam (NL)

(72) Inventors: Joris Bastiaan Verschoor, Amsterdam (NL); Bart Boris Verschoor, Amsterdam (NL)

(73) Assignee: Seal Network B.V., Amsterdam (NL)

( * ) Notice: Subject to any disclaimer, the term of this patent is extended or adjusted under 35 U.S.C. 154(b) by 178 days.

(21) Appl. No.: 17/435,527

(22) PCT Filed: Mar. 2, 2020

(86) PCT No.: PCT/EP2020/055446
§ 371 (c)(1),
(2) Date: Sep. 1, 2021

(87) PCT Pub. No.: WO2020/178240
PCT Pub. Date: Sep. 10, 2020

(65) Prior Publication Data
US 2022/0148378 A1 May 12, 2022

(30) Foreign Application Priority Data
Mar. 4, 2019 (EP) .................................... 19160624

(51) Int. Cl.
*G07F 17/32* (2006.01)

(52) U.S. Cl.
CPC ...... *G07F 17/3241* (2013.01); *G07F 17/3293* (2013.01)

(58) Field of Classification Search
None
See application file for complete search history.

(56) References Cited

U.S. PATENT DOCUMENTS 7,314,407 B1 1/2008 Pearson
10,397,000 B2 * 8/2019 Ngoc-Ai Lu ........ H04L 63/0823
2012/0151515 A1 * 6/2012 Atsmon ................. G06Q 20/12 705/14.1
2012/0214577 A1 8/2012 Petersen et al.
2013/0332355 A1 * 12/2013 Atsmon ................. H04B 11/00 705/41
2014/0040628 A1 * 2/2014 Fort ........................ H04L 63/18 713/182
2015/0295919 A1 * 10/2015 Van Kerrebroeck ... G06F 21/57 726/9
2020/0058190 A1 * 2/2020 Cunningham, II .......................... G07F 17/3241

FOREIGN PATENT DOCUMENTS

JP 2005-276086 A 10/2005
WO WO2007/095566 A2 8/2007

OTHER PUBLICATIONS

International Search Report and Written Opinion for PCT Patent App. No. PCT/EP2020/055446 (dated Apr. 30, 2020).

* cited by examiner

*Primary Examiner* — Ronald Laneau
(74) *Attorney, Agent, or Firm* — Whitestone Law, PLLC

(57) ABSTRACT

Some embodiments are directed to a playing card system configured to authenticate a playing card for playing a card game. The playing card system comprising a playing card, a playing card authentication device, and a playing card authentication server. The playing card comprises an electronic memory storing authentication data, and a counter.

29 Claims, 11 Drawing Sheets

PLAYING CARD WITH ELECTRONIC AUTHENTICATOR

CROSS REFERENCE TO RELATED APPLICATIONS

This application is a national phase filing under 35 C.F.R. § 371 of and claims priority to PCT Patent Application No. PCT/EP2020/055446, filed on Dec. 22, 2017, the contents of which is hereby incorporated in its entirety by reference.

BACKGROUND

Some embodiments of the presently disclosed subject matter relate to a playing card system, a playing card, a playing card authentication device, a playing card authentication server, a playing card authentication method, a computer readable medium.

BACKGROUND

Tradable Card Games (TCG), also known as collectible card games (CCG), are games played with tradable and collectible trading cards. Such games enjoy an increasing popularity. For example, the game "Magic: the Gathering" (MTG) has a large number of active players. Other examples of trading card games include: Pokémon TCG, World Of Warcraft TCG, Hearthstone, among many others. Hybrids forms between computer games and card games are also known. For example, in the game "Kantai Collection", players collect cards as in a TCG, but to play the game, the cards are scanned into a game console, e.g., an arcade console. Another example of such a computer game using tradable cards is "Sengoku Taisen".

In a TCG players collect cards that represent game elements, such as, characters, abilities or the like, which can be used during game play. Typically, players might acquire a large number of playing cards by buying many small stacks of new cards, known as a foil or a pack; often without knowing which playing cards will be included in the foil. From the large number of playing cards, a player assembles a set of cards, known as a deck, with which they can play the game. Players whose deck includes better cards, enjoy some advantage during game play. For example, a pack might contain 6 more or less random cards, while a deck might contain 60 selected cards.

The manufacture and sale of the cards used in tradable card games has grown to a large business. It is estimated there were 22 million players in 2014, with an increase of 35% in the last four years. Apart from the sale of new cards, there is an active secondary market in which players may directly acquire the cards they can require for their decks.

Unfortunately, counterfeiting of playing cards is a significant problem in this business. Playing cards are getting more and more expensive, and the incentive to counterfeit continuous to grow. Counterfeits are very hard to distinguish from authentic cards. Counterfeits erode consumer trust. Without trust in the collectability of the game, cards return to their intrinsic value.

There is therefore a desire to devise a technical solution for the problem of counterfeiting in the field of playing cards.

SUMMARY

The problem is addressed by a playing card system, a playing card, a playing card authentication device, a playing card authentication server, a playing card authentication method, a computer readable medium, as described herein.

The playing card may be arranged for playing a card game. The playing card may include an electronic memory, an antenna, and a processing circuit. The memory may store authentication data and/or a counter. The antenna may be arranged for wireless communication. The processing circuit may be arranged for one or more of

- wirelessly receiving a digital command over the antenna from an electronic playing card authentication device,
- creating an authentication token in response to receiving an authentication command, the creating including reading the authentication data and the counter from the memory and applying a cryptographic function thereto, and
- wirelessly transmitting the authentication token to the device through the antenna, and
- increasing the counter stored in the memory.

The authenticity of the card may be verified using an authentication device and an authentication server. For example, the authentication device may interact with the playing card locally and wirelessly. The resulting token may then be verified using the authentication server, e.g., using information available at the server, e.g., corresponding authentication data and/or a corresponding counter. Note that the token may be generated on the playing card, so that the authentication data does not need to be available outside the card, or at least not all of it. This makes counterfeiting the card harder, since a counterfeiter does not know what information to include in the counterfeited card.

The counter stored on the playing card may be increased after the playing card creates the authentication token. There are at least two different options to do this. In a first option, the counter on the card is leading. For example, after every action this counter may be increased. For example, the playing card may be configured so that it increases the counter together with creating the authentication token. This option has the advantage, e.g., that the transaction is not easily interrupted. Especially, at the card's side, it is unlikely that an authentication token is successfully produced but that the counter is not updated. Although possible, it is more likely that the counter on the card may be increased, while the counter at the server may not be, e.g., because of a failure at the authentication device. In this option it may happen that the counter on the card is larger than the counter at the server.

In a second option, the counter on the server is leading. For example, the counter is increased after the playing card receives a command, e.g., a signal, which indicates that the counter should be increased. Either option could be combined with updating the authentication data on the playing card, after successful authentication. However, the second option has the advantage that the increase-counter command can be combined with a command to update the authentication. For example, after successful authentication new authentication data is sent from the server to the card, possibly through the authentication device, which will be written back on the card. The new authentication data may include the new value of the counter, but may also include a command to update the counter which is present on the card. The authentication data could include random data. The second option has the disadvantage that a transaction may be interrupted more easily. As a result of this, the counter on the card may not be updated, while the same counter stored at the server may be updated. In this option it may happen that the counter on the server is larger than the counter at the card.

The playing card, authentication device and authentication server are electronic devices. In particular playing card, and authentication device may be mobile electronic devices.

In an embodiment the authentication server is configured to generate a computer network address through which an information page is accessible over a computer network. The information page includes information that indicates the result of the authentication of the playing card. For example, the computer network address may be made available to the playing card authentication device.

For example, the authentication server may generate a web page including information about the card. The information may include the authenticity of the card and/or its current owner. The information may also include the date and time when the authenticity of the card was last verified at the authentication server. The information may also include further information about the card, e.g., a picture, textual information and the like. The computer network address may be a URL. The computer network may be the Internet. The computer network address or the URL may be referred to as a proof link. The proof link may be valid for a limited duration. For example, in an embodiment, after the validity of the proof link expired the authentication server may be configured to show that the link expired instead of showing the authenticity information. This feature further reduces the possibility for fraud.

Some other embodiments of the presently disclosed subject matter concerns physical objects including an electronic memory, as the playing card described herein. Like playing card the physical objects may be verified using an online authentication server, via an authentication device. This can be applied, e.g., in objects such a brand shoes, perfume, and the like. An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Possibly, the computer program product includes non-transitory program code stored on a computer readable medium for performing an embodiment of the method when the program product is executed on a computer.

In an embodiment, the computer program includes computer program code adapted to perform all or part of the steps of an embodiment of the method when the computer program is run on a computer. Possibly, the computer program is embodied on a computer readable medium.

Some other embodiments of the presently disclosed subject matter provides a method of making the computer program available for downloading. Such embodiments are used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the presently disclosed subject matter will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a playing card system, FIG. 2 schematically shows an example of an embodiment of a playing card system, FIG. 3*a* schematically shows an example of an embodiment of a blockchain, FIG. 3*b* schematically shows an example of an embodiment of a blockchain network, FIG. 4 schematically shows an example of an embodiment of a playing card authentication method, FIG. 5*a* schematically shows a computer readable medium having a writable part including a computer program according to an embodiment, FIG. 5*b* schematically shows a representation of a processor system according to an embodiment, FIG. 6 schematically shows an example of an embodiment of a playing card system, FIG. 7 schematically shows an example of an embodiment of playing card system, FIG. 8*a* schematically shows an example of a data model of an embodiment of a marketplace application, FIG. 8*b* schematically shows an example of a process diagram of an embodiment of the marketplace application, FIG. 9*a* schematically shows an example of an embodiment of a playing card, FIG. 9*b* schematically shows an example of an embodiment of a card binder, FIG. 10 schematically shows an example of an embodiment of a sneaker with a tag embedded therein.

LIST OF REFERENCE NUMERALS, IN FIGS. 1,2, 3*a*, 3*b*, 4, 5*a*, AND 5*b*

Figure 1:
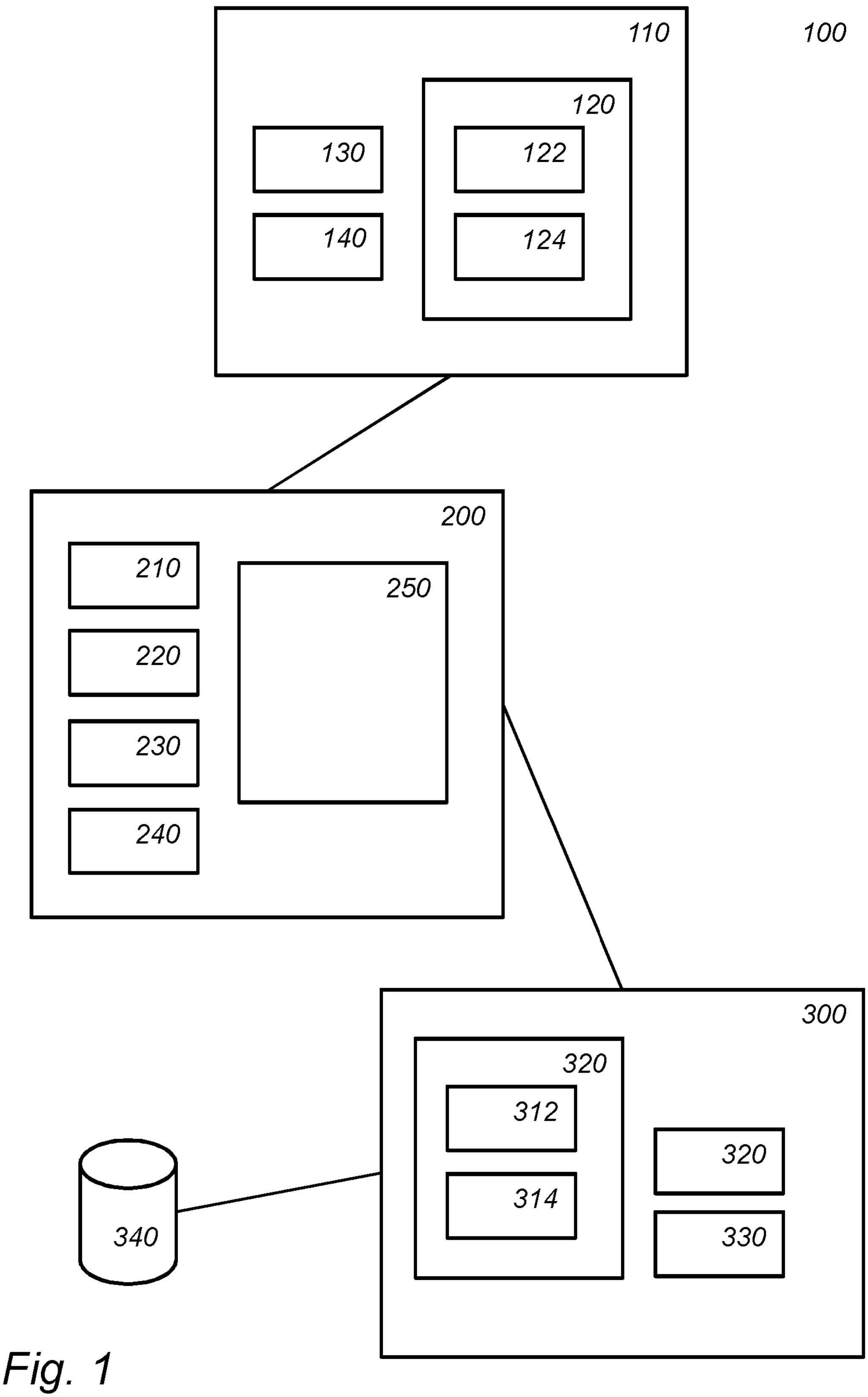

100 a playing card system
110 a playing card
120 an electronic memory
122 authentication data
124 a counter
130 an antenna
140 a processing circuit
200 a playing card authentication device
210 a communication unit
220 an antenna
230 a processing circuit
240 a memory
250 a display
300 a playing card authentication server
310 an electronic memory
312 authentication data
314 a counter
320 a communication unit
330 a processing circuit
340 a playing card database
400 a playing card system
410 a playing card
411 printed information
412 a chip
413 an antenna
414 text
415 additional text
416 a picture
450 a mobile phone
500 a blockchain
511, 512 a transaction
521, 522 a transaction
510, 520 a block
519, 529 a consensus proof
530 a blockchain network
531-533 a blockchain device

1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF EMBODIMENTS

While this presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit the presently disclosed subject matter to the specific embodiments shown and described.

In the following, for the sake of understanding, elements of embodiments are described in operation. However, it will be apparent that the respective elements are arranged to perform the functions being described as performed by them.

Further, the presently disclosed subject matter is not limited to the embodiments, and the presently disclosed subject matter lies in each and every novel feature or combination of features described herein or recited in mutually different dependent claims.

As pointed out above, there is a desire for technical measures that will make counterfeiting harder. A possible solution to the counterfeiting problem is to embed an RFID tag in playing cards, e.g., a near field communication (NFC) tag. For example, the RFID tag may identify the card. An RFID reader, e.g., a mobile phone, an NFC reader, etc., may read-out the identifying information on the tag. If the identifying information on the tag corresponds to the identifying information that is visually printed on the card, it may be concluded that the card is authentic. This solution makes counterfeiting of cards harder since it can require the embedding and writing of an RFID tag in addition to an accurate visual reproduction of a card in order to counterfeit it. For example, a NFC tag may be used for the RFID tag. For example, an MTG playing card may have its unique identifier stored on an RFID chip embedded in the playing card. For example, if one reads out the unique identifier, say 5d8a7f95-ac4c-4113-8bdd-55336b86b98c, one can look-up that this identifier corresponds to a card with a card type which has the so-called multiverseid 193868 and name "Lord of the Pit". One could also store only the card type identifier, or multiverseid, but this prevents card-specific information to be added on a server, such as experience points or the owner of the card. The link between the unique physical card and its digital representation using the unique identifier is called a digital twin. If the card in question is found or identified as a "Lord of the Pit", one can conclude that it is likely authentic. Although this solution is an improvement over card without an embedded RFID chip, it was found that solution is not inadequate, since RFID tags can be copied too easily.

FIG. 1 schematically shows an example of an embodiment of a playing card system 100 that addresses this problem. System 100 includes a playing card authentication device 200, and an authentication server 300. The system may also include one or more playing cards. FIG. 1 shows one playing card 110, there may be more playing cards.

For example, in operation of system 100, playing card authentication device 200 may interact wirelessly with playing card 110. For example, a playing card authentication device 200 may receive a cryptographic token derived from authentication information stored on playing card 110. Playing card authentication device 200 and playing card 110 are located near each other so that the two devices can communicate through a direct wireless connection. Playing card authentication device 200 can then authenticate playing card 110 with authentication server 300. For example, server 300 may verify the cryptographic token. The result of the authentication may be displayed as a success or failure signal on authentication device 200. As part of the authentication operation, playing card 110 may be modified; for example, a counter may be increased and/or the authentication data may be modified, e.g., overwritten.

Playing card 100 includes an electronic memory 120, an antenna 130 and a processing circuit 140. For example, memory 120, antenna 130 and circuit 140 may be implemented as an RFID tag, e.g., an NFC tag. Antenna 130 is arranged for wireless communication, e.g., RF communication, e.g., NFC communication. In an embodiment, the wireless communication may be of another type, e.g., Bluetooth, ZigBee, Wi-Fi, UHF, etc., but NFC is a particular type. The playing card may receive commands over antenna 130 which may be executed by circuit 140. Circuit 140 may be a simple circuit, configured only for the specific functions of an embodiment, or may be a general purpose circuit programmed therefore. NFC may be used for wireless communication between a chip in card 110 and device 200.

Playing card 110 may be a paper card, a laminated card, a plastic card, etc., in which circuitry is embedded.

The memory 120 is wirelessly readable, e.g., by playing card authentication device 200. For example, playing card authentication device 200 may, e.g., send a read command to antenna 130. In an embodiment, memory 120 is also writable, e.g., by sending a write command to antenna 130. However, writing to memory 120 is optionally. For example, memory 120 may be read-only. For example, the contents of memory 120 may be set during manufacture of playing card 110. For example, memory 120 may be a write-once memory. Un-writable memories have the advantage that a counterfeiter cannot change the memories content. However, as described below some embodiments make use of writable memories, to gain an advantage. Memory 120 includes at least authentication data 122, and possibly also a counter 124. The authentication data 122 may be used in an authentication operation that proves the authenticity of the card. For example, authentication data 122 may be a random number, e.g., chosen at random at manufacture, or during a later operation, e.g., during an authentication operation. For example, a random number is a number that cannot be predicted. For example, authentication data 122 may include a cryptographic key, e.g., a symmetric key, e.g., a private key of a public/private key pair. The counter may be increased whenever the authentication data 122 is involved in an operation, e.g., whenever an authentication operation is performed and/or whenever the authentication data is renewed. The initial value of the counter may be a default number, e.g., zero, which may be the same for all playing cards, e.g., all playing cards of this type; the initial value may be a random value. Memory 120 may store a unique identifier, or additional information such as card type, e.g. its multiverseid.

The processing circuit may be configured to receive digital commands over the antenna from playing card authentication device 200. For example, the command may be an authenticate command, that instructs the card to authenticate itself to device 200. In response to receiving the command, the circuit creates an authentication token. Creating the token includes reading the authentication data from memory 120 and the counter from the memory 120 and applying a cryptographic function thereto. There are several ways in which this can be done, some examples of which are described below. After the construction of the token, the authentication token is transmitted wirelessly to authentication device 200, e.g., through the antenna 130. After creation or after transmission, e.g., after complete or successful transmission, counter 124 in memory 120 is increased. For example, the counter may be increased directly after reading of the authentication data or after creation of the token. For example, the counter may be increased after receiving an acknowledgement of device 200 that a token has been successfully received.

Memory 120 may store additional information relevant to playing card 110. For example, memory 120 may store a playing card identifier. The playing card identifier may be included in the authentication token, or may be transmitted along with the token. For example, the playing card identifier may be a unique number, e.g., a UUID. The playing card identifier may or may not be an input in computing the authentication token.

Processing circuit, and memory may be integrated in an IC, e.g., an NFC IC. The IC may be embedded in the playing card. The IC may be configured to perform cryptographic operations. The IC may be able to run general purpose computer instructions, e.g., applications, this is however not necessary. For example, the IC may be hardwired to execute only a limited set of operations. In an embodiment, the memory may be read wirelessly. However, in an embodiment, the memory cannot directly be read wireless, and can only be access through the processing circuit. This has a security advantage, if the contents of the memory cannot be obtained it cannot be copied either. For example, the circuit may be configured to read the memory, e.g., the authentication data, but to only transmit the authentication data after the cryptographic function has been applied to the authentication data, e.g., in the form of an authentication token.

Authentication device 200 may be configured to verify the authenticity of a playing card, in particular of playing card 110. The playing card authentication device includes an antenna 220 arranged for wireless communication with a playing card. For example, antenna 220 and antenna 130 may be arranged for the same type of wireless communication, e.g., the same type of RF communication, e.g., the same type of near field communication (NFC).

In addition to antenna 220, authentication device 200 may also include a communication unit 210 arranged to communicate over a computer network to playing card authentication server 300. For example, communication unit may be configured to communicate over the Internet. Communication unit 210 may also be wireless, e.g., configured for Wi-Fi, 3G, 5G or the like. The wireless communication type of communication unit 210 may be different from the communication type used by antenna 220 and 130.

Authentication device 200 includes a processing circuit 230 and a memory 240. For example, memory 240 may store computer instructions executable by processing circuit 230. For example, the processing circuit 230 may be configured to wirelessly send a digital authentication command over the antenna to playing card 110. For example, the playing card 110 may be arranged to cooperate with authentication device 200 and to transmit at least an authentication token in response. For example, processing circuit 230 may be configured to receive from playing card 110 the authentication token in response to the digital authentication command. Authentication device 200 may be configured to send the authentication token to the authentication server through the communication unit, and receive from the authentication server information on the authenticity of the playing card. For example, authentication device 200 may receive from server 300 whether or not playing card 110 is authentic, e.g., genuine, or not. Device 200 may also receive from server 300 updated authentication data which is to be transferred to device 110.

Authentication device 200 may include a display 250 configured to show information of the authentication operation. For example, device 200 may be configured to display information on the kind of playing card, e.g., received from playing card 110, or from authentication server 300. Display 250 may also be used to display the result of the authentication operation. Before sending on the token, authentication device 200 may add or modify information. For example, authentication device 200 may sign the token with a cryptographic key, e.g., a private key, to indicate to server 300 that authentication device 200 itself is an authentic device.

Authentication server 300 may be configured to verify the authenticity of a playing card, in particular playing card 110. Playing card authentication server 300 may include a communication unit 320 arranged to communicate over a computer network with playing card authentication device 200. For example, communication unit 320 may be configured to use the same computer network as authentication device 200, e.g., the Internet.

Authentication server includes a memory 310. Memory 310 may be configured to store computer instructions for execution by a processing circuit 330. However, memory 310 may also be configured to store authentication data 312 and a counter 314. For example, authentication data 312 and a counter 314 may be retrieved from a playing card database 340. Playing card database 340 may be part of server 300, or may be external to server 300. For example, database 340 may be stored on an external server in digital communication with server 300, e.g., in the cloud.

For example, playing card database 340 may store authentication data 312 and a counter 314 indexed with a playing card identifier, e.g., the playing card identifier of playing card 110.

In an embodiment, counter 314 is supposed to be equal to counter 124. After successfully authentication of card 110, counter 314 is increased, so that counter 124 and counter 124 remain the same. Only if there have been problems, or if playing card 110 is not authentic may counter 314 and counter 124 diverge from each other.

Increasing counter 124 at card 110 may be performed upon instruction of server 300. In this case, one problem that may occur is that increasing of counter 124 fails for some reason, e.g., because the card is removed from a near field before the operation is complete. In that case, counter 314 may be larger than counter 124. To avoid that counter 124 may become lower than counter 314 in this scenario, card 110 may be configured to increase counter 124 before computing the authentication token.

Accordingly, it may happen that the counter on the card and the counter on the server diverge. To counter this problem, a card may be accepted as authentic if counter 314 minus counter 124 is less than a threshold. For example, one may have the equation: counter 124+#problems=counter 314, so that one may accept if the number of problems #problems=counter 314−counter 124 is less than a threshold, e.g., less than 10, less than 100, etc. The threshold may be determined empirically as a tradeoff between security and user friendliness.

On the other hand, for example, in an embodiment the counter may be increased whenever the authentication data 122 is involved in an operation, e.g., whenever an authentication operation is performed and/or whenever the authentication data is renewed; regardless of the fact that a resulting token is verified on the authentication device or the authentication server. This procedure has the advantage that it reduces communication between playing card and authentication device; for example, it is not needed to give an additional command to the playing card to increase its counter, e.g., after waiting for an acknowledgement of the server. Reducing communication also reduces that chance of corruption. It may still happen though that the counter on the card and the counter on the server diverge; for example, if for some reason the authentication device fails to forward the token, then the counter may be increased at the playing card but not at the server. In this situation the counter on the card may be higher than the counter on the server. To counter this problem, a card may be accepted as authentic if counter 124 is higher than counter 314, e.g., if counter 124 minus counter 314 is less than a further threshold. Both options may be supported at the same time. The two thresholds need not be equal. If a token is accepted, even though the counters differ, then the counter on the server may be adjusted so that it is equal to the counter on the card.

In an embodiment, authentication data 124 and authentication data 314 are equal, e.g., equal numbers, equal cryptographic keys, etc. In an embodiment, authentication data 124 and authentication data 314 are corresponding members of a cryptographic key pair. For example, authentication data 124 may be a signing key and authentication data 314 may be the corresponding verification key. Signing key and verification key may form a cryptographic asymmetric key pair, e.g., an RSA key pair, an ECDSA key pair, etc.

Authentication server 300, e.g., processor circuit 330, may be configured to receive from playing card authentication device 200 an authentication token. The authentication token may be created by playing card 110 from authentication data 122 and optionally counter 124, etc. The authentication token is verified using authentication data 312 and counter 314. If the verification is successful, then a success signal may be sent to authentication device 200. The success signal may indicate the authenticity of playing card 110 to playing card authentication device 200. After successful authentication of playing card, the counter for that card, e.g., counter 314 and optionally also in the database is increased. By not increasing the counter in case of a failed authentication it is avoided that an attacker can distort counters. In an embodiment, the counter can be recovered from an authentication token, although this is not necessary.

To further improve security, the authentication device 200 and authentication server 300 may authenticate each other. For example, in an embodiment there may be many authentication devices 200 in the system. For example, authentication devices 200 may be implemented as a smartphone on which an appropriate app has been installed. There is thus a risk that an attacker may use fake authentication device. This risk can be reduced by authentication of the authentication device 200 to the server. For example, in an embodiment, playing card authentication device 200 may be configured to authenticate playing card authentication server 300, and/or playing card authentication server 300 may be configured to authenticate playing card authentication device 200. For example, device 200 and server 300 may be configured to perform an SSL handshake.

Below a number of examples of authentication tokens, their creation and authentication are given.

In an embodiment, the authentication data 122 and 312 are cryptographic keys. For example, authentication data 122 stored in the playing card may be a private key (Priv) of a public/private key pair, and the authentication data 312 stored in the playing card authentication server may be the public key (Pub) of the public/private key pair. For example, authentication data 122 stored in the playing card may be a symmetric key (K), and the authentication data 312 stored in the playing card authentication server may be the same key (K).

The authentication token may be computed by playing card 110, e.g., circuit 140, by using its key in a keyed cryptographic operation. For example, the keyed cryptographic operation may be a signature operation, an encryption operation, or a keyed hash operation. For example, the token may be computed by signing the counter. For example, the token may be computed by signing a challenge value received by playing card 110 from device 200, e.g., together with an authentication command. The challenge value may be a nonce, e.g., a random number. Signing may be done with a private key and a symmetric key; in the latter case, the operation is sometimes referred to as computing a message authentication code.

Authentication server 300 may verify that the token was created by applying a keyed cryptographic function to a counter and/or a challenge by recreating the token from authentication data 312, e.g., if authentication data 312 and authentication data 122 are equal. For example, server 300 may apply the same keyed cryptographic function, e.g., a signature, encryption or keyed hash operation, to counter 312 and/or the challenge, and verify that server 300 computed the same token as received from playing card 110 via device 200. Alternatively, if authentication data 312 and authentication data 122 are part of a cryptographic key pair, the server may perform the corresponding keyed function, using authentication data 312 as key. For example, perform a signature verification to verify if the token is a valid signature of counter 312, or a decryption operation using authentication data 312 as key and verify that the outcome is counter 312.

In an embodiment, device 200 first contacts server 300 to request a challenge. Server 300 then generates a challenge, e.g., a random number, and sends it to device 200. Device 200 then sends the authentication command together with the challenge. Playing card 110 then applies the cryptographic function to the challenge, or to the challenge and counter 124. Server 300 can then verify that the token corresponds to counter 314 as well as to the challenge.

Verifying the counter 124 is easiest if it were required that counter 124 and counter 314 are equal. In practice, a difference can be accommodated by verifying the token for counter 314 minus a number of small decrements, e.g., minus 1, minus 2, etc., up to the threshold. In addition or instead, increments may be used as required. This allows for the fact that an authentication may succeed at device 200 and server 300 but incrementing the counter at the card may fail, etc., or if increasing the counter at card succeeds but authentication fails at device 200 or server 300. This approach may cause that the verification is performed multiple times. In an embodiment, the cryptographic function is a keyed bijective function; for example, an encryption or a signature with message recovery. This has the advantage that counter 124 can be recovered from the token, by applying the keyed inverse function. In this case, the counter 124 and counter 314 can be explicitly compared. This gives more flexibility in allowing authentications to proceed even if counter 124 and counter 314 are not exactly equal. Moreover, no multiple verifications are needed for different values of the counter to cover the eventuality of a difference between the two counters.

In an embodiment, a token is computed, e.g., as above, and verified by server 300, in addition server 300 generates and sends new authentication data 122 and updates authentication data 312. Device 200 receives the new authentication data and sends it to playing card 110 for writing in memory 120. For example, a new symmetric key or new private key may be written in memory 120. The new authentication data is also updated in server 300, e.g., authentication data 314 and/or database 340. This has the advantage that an illegal copy of playing card 110, will have the old authentication data. For example, anytime a card is authenticated, its authentication data may be renewed, with the effect that all previous copies of the playing card become invalid. If one tries to authenticate an illegal copy, then its authentication data may not correspond to the authentication data stored in server 300, and thus the authentication will fail.

In an embodiment, one could use a random string for the authentication data, without applying a cryptographic function, so that the token would equal the authentication data. If the authentication data is always in this particular embodiment updated then this would be a particular low-cost solution for authenticating playing cards. To verify the token, server 300 compares it to the stored authentication data.

An advantage of updating the authentication data is that duplicates of the card are automatically invalided. If a user makes an unauthorized copy of a card, then the first card that is verified with server 300 is the valid card, at least in so far as the server can determine. This is an incentive not to allow one's card to be copied, since if the copy is verified first, the original is automatically invalided.

For example, the playing card authentication server may be arranged to generate new authentication data, and if the verification succeeded, send the new authentication data to the playing card authentication device. The new authentication data may be a new key or a new random string. The playing card authentication device may be arranged to receive the new authentication data over the communication unit, and send the new authentication data to the playing card over the antenna. The playing card may be arranged to receive the new authentication data over the antenna and write the new authentication data to the memory.

In an embodiment, memory 120 may store a key. Processing circuit 140 may be configured to encrypt the counter using the key. The token may include the encrypted counter. Processing circuit 140 may receive a challenge from authentication device 200. The challenge may also be encrypted. Instead of encryption a signature may be computed and included in the token. The signature may be an asymmetric signature or symmetric signature, e.g., a MAC, e.g., a keyed hash, etc. The key may be a private key.

In an embodiment, memory 120 stores the private key and a corresponding public key. The public key may be retrieved from the chip by device 200. The counter may also be retrieved. The token may include, or be, a signature over the counter and/or a challenge. The authentication device 200 may use the public key to verify the signature. For example, the signature may be verified over the counter and/or the challenge. The public key may be protected using conventional methods, e.g., with a signed certificate, such as a X.509 certificate. Interestingly, this allows the token to be verified locally, e.g., using the key read from the playing card, and non-locally, at server 300 using a public key stored at server 300. In an embodiment, the authentication data on playing card 110 is updated only if the token is verified through server 300 but not when it is verified locally. Note that updating authentication data is optional.

In an embodiment, before authenticating playing card 110, authentication device 200 requests a challenge from server 300. Server 300 generates the challenge and sends it to authentication device 200. Authentication device 200 then requests a token from playing card 110. Playing card 110 may process the challenge, e.g., with the counter, with the key, e.g., encrypt or sign it. The token may also include an identifier of playing card 110. Authentication device 200 may then forward the token to server 300 for verification.

The system may be used to store one or more game parameters. For example, a game parameter may be stored at card 110 and/or at server 300. When the game parameter is needed, e.g., in game play it may be retrieved from card 110 and/or at server 300, e.g., by an authentication device, e.g., a mobile phone.

For example, memory 120 may include a game parameter which can enhance game play in several ways. For example, the game parameter may be modified when the playing card's authenticity is verified. For example, if an authentication token was sent by the playing card which correctly verifies, then a modified game parameter may be provided. For example, the modified game parameter may be provided to the playing card and stored thereon. For example, the modified game parameter may be shown on a display of the authentication device. The game parameter may be stored at server 300 instead or in addition.

For example, the game parameter may represent so-called experience points. For example, a card may gain experience points, which may be stored in a database, e.g., at server 300 and/or card 110. Experience points may be gained by playing with the card on a tournament. Cards may become better over time by gaining experience points. This would incentivize players to attend tournaments by leveling-up cards. Furthermore, the monetary value of cards comes from playing the game, not from using them as a proxy stock-market.

Figure 2:
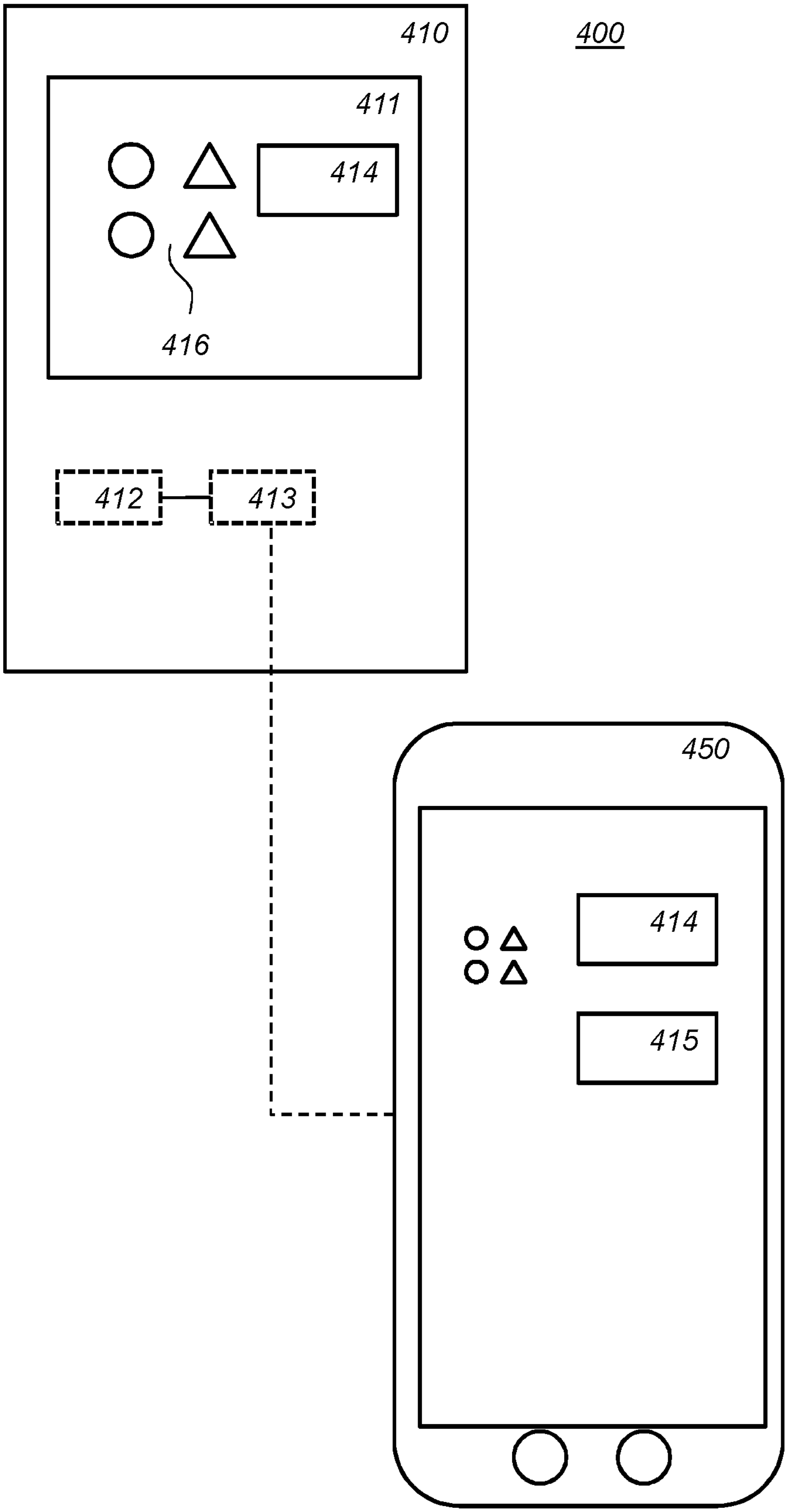

FIG. 2 schematically shows an example of an embodiment of a playing card system 400. FIG. 2 shows a playing card 410. Playing card 410 has printed information 411 visible on it. The printed information 411 may include a picture 416 and text 414. For example, the picture may show a game character and the text may show game parameters, e.g., capabilities, or the like.

Playing card 410 may include a chip 412, and an antenna 413. Chip and antenna may be configured as described herein. For example, antenna 413 may be arranged for wireless communication, e.g., with an authentication device. Chip 412 may be configured to

- wirelessly receive a digital command over the antenna from an electronic playing card authentication device,
- create an authentication token in response to receiving an authentication command, the creating including reading the authentication data and the counter from the memory and applying a cryptographic function thereto,
- wirelessly transmit the authentication token to the device through the antenna, and
- increase the counter stored in the memory.

FIG. 2 further shows a mobile phone 450. Mobile phone 450 may be configured as an authentication device. Mobile phone 450 may include a communication unit arranged to communicate over a computer network to a playing card authentication server, and an antenna arranged for wireless communication with a playing card, such as playing card 410.

Mobile phone 450, e.g., an app installed thereon, may be configured to communicate with chip 412 and receive information. The information may include an ID that identifies card 410. Mobile phone 450 may obtain information regarding this playing card and/or this type of playing card. For example, phone 450 may obtain the information from chip 412 or from a server, e.g., such as server 300. For example, the playing card authentication server may be arranged to send information regarding the playing card for display on the playing card authentication device. For example, the information may be requested from server 300 using the ID. Mobile phone 450 may be configured to display the information. For example, in this case, phone 450 displays a picture, e.g., picture 416, text, e.g., text 414, additional text 415. For example, additional text 415 may include additional game parameters. Phone 450 may be configured to wirelessly send a digital authentication command over the antenna to the playing card, receive from the playing card an authentication token in response to the digital authentication command, send the authentication token to the authentication server through the communication unit, and receive from the authentication server information on the authenticity of the playing card.

When a playing card, such as card 410 or 110, is first used it may be claimed by the user. For example, the authentication device, e.g., 200 or 450, may include a user identifier which identifies a user of a further service of the playing card authentication server. The playing card authentication device may be configured to send the user identifier with the authentication token. The playing card authentication server is arranged to associate the user identifier with the playing card identifier in the memory of the playing card authentication server, the playing card authentication server being arranged to provide access to the playing card in the further service. For example, after manufacture of card 110 or 410, its ID may be registered with the server. The card may initially be registered as unclaimed. When the token for the card is first received, and verified, a user ID that is received with the token may be stored by the server as the owner, or claimant, of the playing card. For example, a playing card may be scanned by a consumer after opening a pack in order to claim ownership, e.g., using his smart phone. The initial seller, such as the manufacturer or a retailer, might be the first owner of the card. In this case the seller needs to transfer ownership to the buyer of the card. This can be linked to a cash-register or an online e-commerce store. The store may be the current owner; upon payment, the owner would be transferred, or the owner-locked status would be set free, so someone, e.g., the purchaser, could claim ownership When a user acquires the card from a previous owner, he can send a token with the new user ID to register the new owner or claimant of the card. This allows users to manage their card collection online, e.g., through a website maintained by server 300. It also allows the system to trace theft, mark a card as missing or set a transfer-lock on a card. For example, a transfer-lock may be implemented by storing, e.g., at server 300 a blacklist of card-ids that are not be transferred. For example, if a card is stolen, it may be reported as such through the online collection, e.g., the website. If a claim for the card is received a signal may be generated so that an appropriate follow-up action can be taken, e.g., can require the new owner to legally identify himself. Depending on the configuration, there can be different requirements to transfer digital ownership of the card. One example is that physical access to a card is leading to transfer ownership, so that an authentication token can be used to validate the operation. Another example is that only digital ownership can be required to transfer ownership. The last example is that both physical and digital ownership can be required to transfer ownership.

Interestingly, this allows a user to link his physical card collection to an online card collection, also referred to as "digital twins". For example, scanning an NFC-card and transferring ownership adds it to one's online collection. This may allow one to play a game both online and offline using the playing card in one's possession. For example, server 300 may be arranged for online game play between two or more players using their online card collections. Offline the same or different users may use their physical cards to play the same or a different game. Interestingly, online game play may allow game parameters to be altered. When a playing card is verified, an altered game parameter may be downloaded on to the card. An authentication device, e.g., a mobile phone, may be used to write and/or read out the game parameter. This allows offline play, using an altered game parameter that was altered through online play. For example, a card may level up online, which may benefit a user offline when using the physical, e.g., paper, card.

For example, the playing card authentication server may maintain a collection of cards for multiple users, e.g., players, e.g., in a database storing cards that have been authenticated for a user. The server may offer additional services in various forms, for example, the server may provide a digital game play interface configured to receive a game play instruction referencing a card of the user. For example, the instruction may be a game play move, e.g., received from the user, or from some other user. The instruction may refer to a card of the user for some game-related purpose. Before allowing the instruction to complete, e.g., to perform some game-related objective, the playing card authentication server may verify that the referenced card has been authenticated for the user, e.g., by referring to the database. The server may operate this interface for its own purpose, e.g., if the server is also configured as a game server; however, the server may also or instead perform this service for third-party game servers. This feature makes it possible that online game mirrors the games that can be played in real life, e.g., with the same cards.

A potential problem with updating playing cards wirelessly, especially if the playing card does not have its own power source is corruption of the playing card date. This problem may be addressed by a card memory that includes at least two areas for storing authentication data. The processor of the card being arranged to write the authentication data to the memory to a different area than the area storing the authentication data used to generate the authentication token. This ensures that authentication data that was used to validly create a token, and which is thus non-corrupted, remains valid and on the card. A next time a token is needed the updated data is used, so that the old authentication data is overwritten. For example, the areas may include the counters, so that initially the highest counter is used to generate the token, only if the data is corrupted or the token turns out to be invalid a token is created using the older data.

Another potential problem is that someone may try to claim a card without buying the card, e.g., while it is in the store, e.g., to claim it as the first owner. One might do this to add the card to an online collection without having to buy the card, e.g., to aid online game play, or perhaps to be a nuisance. There are several ways in which this problem may be addressed.

For example, the playing card may be wrapped in a foil, e.g., as part of a pack. The foil may be a metallic foil or may be lined with a metallic material to attenuate the wireless signal to and from the antenna of the playing card.

For example, a playing card pack may include, in addition to one or more playing cards a further card, the further card including an antenna arranged for wireless communication and a processing circuit arranged to distort the wireless signal of the one or more playing cards.

For example, a playing card may have its owner set to the retailer which is selling the card. Upon purchasing the retailer needs to un-set the card's owner, so that its buyer can claim the card, because it is not protected by any ownership, or the retailer needs to digitally transfer the cards ownership to its buyer. The buyer would communicate its player id to the retailer, for example by typing in a code, scanning a QR code, wirelessly transferring using 3G, WiFi or NFC. The code is then used to send a request to server 300, which will update the card's owner.

Alternatively, a unique code, printed on the inside of the pack, or printed on a card included in the pack can be used to set the cards owner.

Figure 3A:
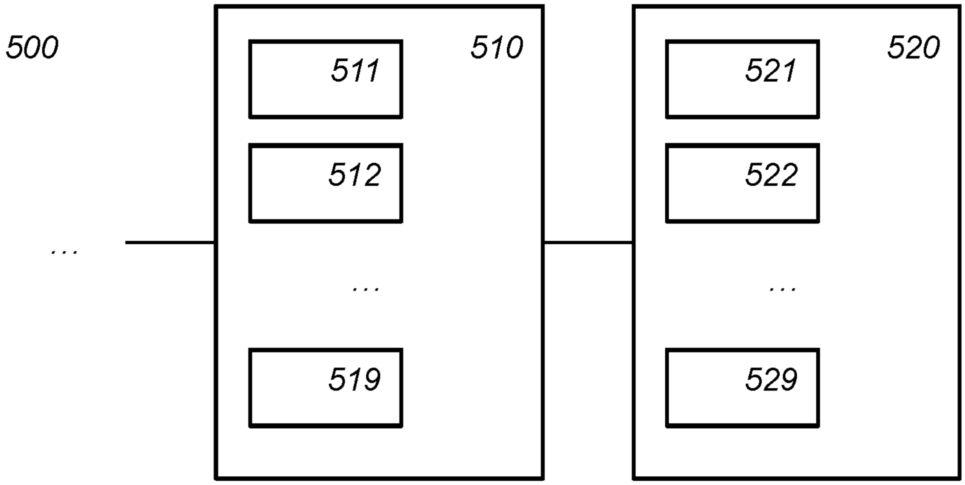

FIG. 3*a* schematically shows an example of an embodiment of a blockchain 500. Shown are two blocks of the blockchain: block 510 and block 520. The block includes one or more transactions. Shown are transactions 511, 512, 521 and 522 in blocks 510 and 520 respectively. The blocks also include a consensus proof 519 and 529 respectively. The consensus proof is computed by a blockchain device, and may be, e.g., a proof of work, or a proof of stake, or the like. The transactions may indicate the claiming and/or transfer of a playing card. A transaction may indicate an authentication of a playing card.

Figure 3B:
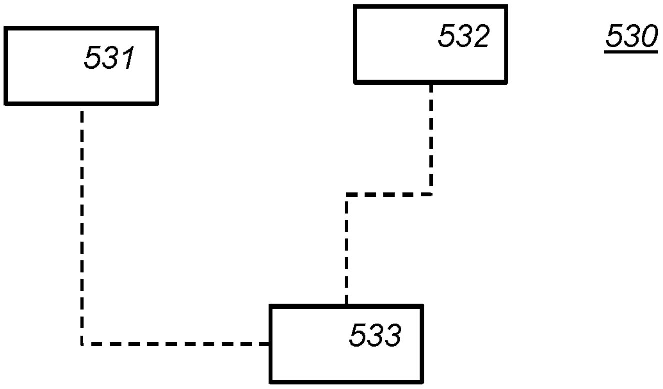

FIG. 3*b* schematically shows an example of an embodiment of a blockchain network 530. The blockchain network 530 includes blockchain devices, shown are blockchain device 531, 532 and 533. For example, blockchain network 530 may be a peer to peer network, in which blocks of the blockchain, transactions, etc., are communicated. For example, an authentication device, e.g., device 200, 450, etc., or the server, may generate a blockchain transaction including the playing card identifier, and transmit the blockchain transaction to a blockchain network so that the transaction is processed by a blockchain management device for including in a block on the blockchain. The transaction may include the authentication token. A blockchain device is sometimes referred to as a miner.

In an embodiment, a card's public key may be stored in the blockchain, while the private key is uploaded to the chip. This may be done when the card is manufactured, or when the card is first claimed, etc. The blockchain may take the place of database 340.

Saving cards or card transactions on the block chain prevents server side hacks. For example, the transaction lineage may be checked for a transaction. Furthermore, transferring a card twice becomes much harder, since it can be verified on the blockchain who is the owner of a card. The cost of hosting the blockchain devices could eventually be covered by players. For example, a blockchain miner may be rewarded with points that can be exchanged for exclusive mining foils.

In an embodiment of a card system or method, one or more of the following may be performed:

1. Creating a print command.
    a. Create new key-pair, e.g., a public key, private key pair. Create a Card-Id. The Card-Id may be the hash of the public key. Sign the new Card-ID with a private key of a card authority. Instead of a key-pair a symmetric key may be used. For example, one may store on the card a private key, the card-ID. One may also store the public key on the card to enable local verification. The public key and card-ID may be stored in a database.
    b. Cards are printed with an embedded NFC chip.
    c. Public key may be stored in a blockchain or database, etc.
        i. For example, one may store each unique key in a database enriched with card data
2. Printing command and keys are sent to the press
3. Uploading the private key to chip, e.g., an NFC chip, embedded in the physical card. Finished cards may contain NFC chip with unique private key stored on the card and a corresponding public key stored on a database
4. Packaging, distributing and/or selling cards to consumers
5. Claiming an unclaimed card, e.g., sending a command to the card to obtain digital signature, e.g., Sig=sign (private key, message). The message may include a counter and/or a challenge.
6. Verifying the digital signature using the corresponding blockchain. The public key may be obtained locally from the card, from a server, and from a blockchain. Verify (publickey, message, sig) to verify the authenticity. If successful, the card may be claimed. The verification may be done on a server or on an authentication device.
7. Sending success response to app. The transaction may be stored in the blockchain. A new private and public key may be generated and uploaded (this is optional). For example, existing private on the chip may be overwritten with a new private key. Transferring a card may follow the same procedure.

Typically, the playing cards, authentication devices and servers each include a microprocessor which executes appropriate software stored at the device; for example, that software may have been downloaded and/or stored in a corresponding memory, e.g., a volatile memory such as RAM or a non-volatile memory such as Flash. Alternatively, the devices, especially the playing cards, may, in whole or in part, be implemented as a so-called application-specific integrated circuit (ASIC), e.g., an integrated circuit (IC) customized for their particular use. For example, the circuits may be implemented in CMOS, e.g., using a hardware description language such as Verilog, VHDL, etc.

In an embodiment, the playing card, authentication device and/or server may include one or more processing circuits to implement their functionality. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. The circuits may also be, FPGA, ASIC or the like.

Figure 4:
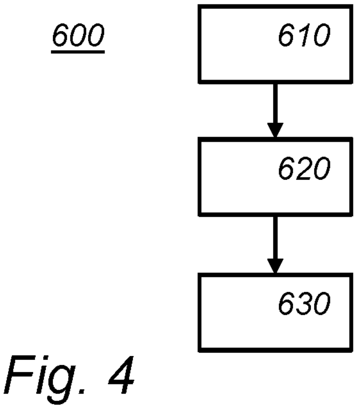

FIG. 4 schematically shows an example of an embodiment of a playing card authentication method 600. Method 600 includes

- wirelessly sending (610) a digital command over an antenna to the playing card authentication device to cause the playing card to create an authentication token, the playing card including an electronic memory (120) storing authentication data (122), and a counter (124), creating the authentication token includes applying a cryptographic function to the authentication data and the counter,
- wirelessly receiving (620) the authentication token from the device through the antenna,
- having the authentication token verified (630) with the counter and authentication data stored in the memory of a playing card authentication server.

Many different ways of executing the method are possible, as will be apparent to a person of ordinary skill in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method.

Embodiments of the method may be executed using software, which includes instructions for causing a processor system to perform method 600. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product includes computer executable instructions corresponding to each of the processing steps of at least one of the methods set forth. These instructions may be subdivided into subroutines and/or be stored in one or more files that may be linked statically or dynamically. Another embodiment relating to a computer program product includes computer executable instructions corresponding to each of the means of at least one of the systems and/or products set forth.

Figure 5A:
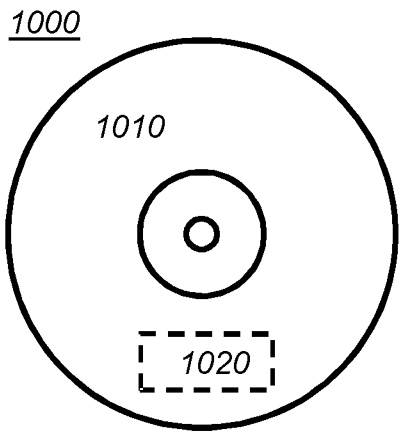

FIG. 5*a* shows a computer readable medium 1000 having a writable part 1010 including a computer program 1020, the computer program 1020 including instructions for implementing a playing card, authentication device and/or server on a processor system, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 includes instructions for causing a processor system to perform as a playing card, authentication device and/or server.

Figure 5B:
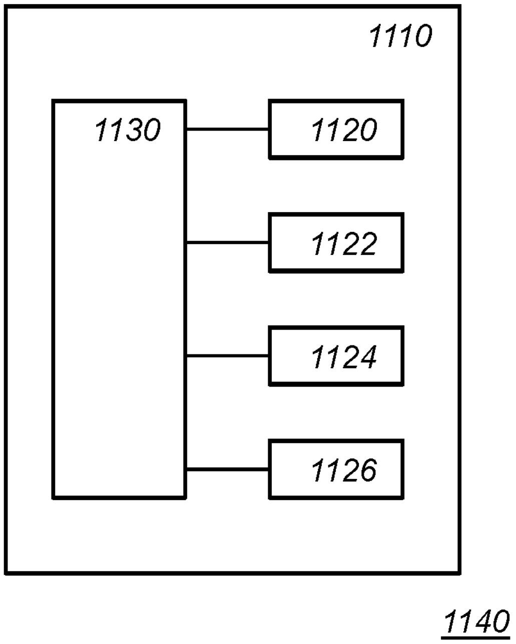

FIG. 5*b* shows in a schematic representation of a processor system 1140 according to an embodiment of a playing card, authentication device and/or server. The processor system includes one or more integrated circuits 1110. The architecture of the one or more integrated circuits 1110 is schematically shown in FIG. 5*b*. Circuit 1110 includes a processing unit 1120, e.g., a CPU, for running computer program components to execute a method according to an embodiment and/or implement its modules or units. Circuit 1110 includes a memory 1122 for storing programming code, data, etc. Part of memory 1122 may be read-only. Circuit 1110 may include a communication element 1126, e.g., an antenna, connectors or both, and the like. Circuit 1110 may include a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the playing card, authentication device or authentication server may include a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may include a non-volatile software interface, e.g., a hard drive, a network interface, etc., arranged for providing the software.

Figure 6:
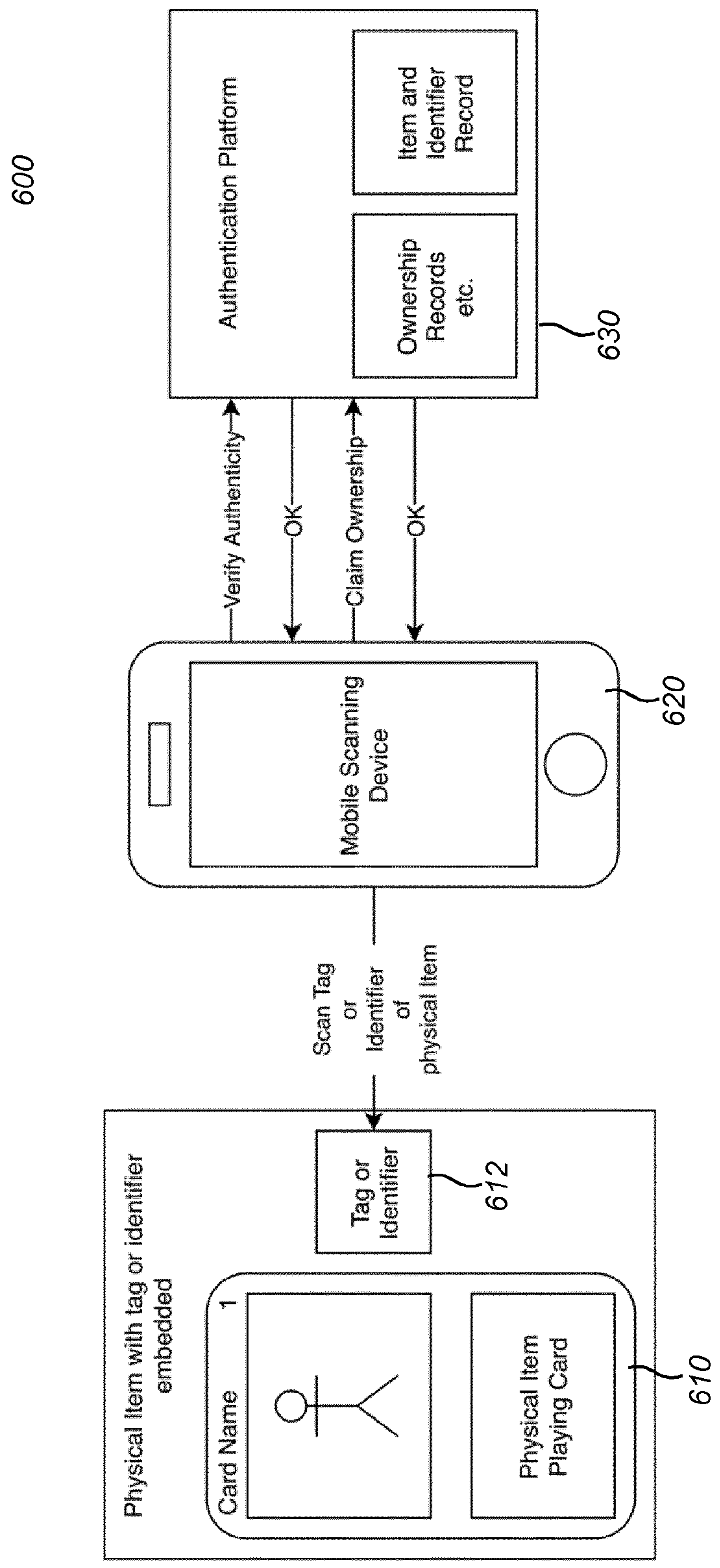

FIG. 6 schematically shows an example of an embodiment of a playing card system 600. FIG. 6 further visualizes claiming of an item, e.g., claiming ownership of the item.

System 600 includes multiple playing cards; show is a playing card 610. Playing card 610 may have various information printed thereon; shown is a card name 'card name 1', and a picture. Playing card 610 includes an electronic tag 612. Tag 612 may store a playing card identifier, e.g., a number or the like. In an alternative embodiment, a computer readable identifier may be used, e.g., a QR code or the like. However, a QR code can simply be re-used so the latter is not preferred.

System 600 includes a mobile scanning device 620, e.g., a playing card authentication device. System 600 includes an authentication platform 630, e.g., a playing card authentication server. Mobile scanning device 620 is configured to read tag 612 and to communicate with authentication platform 630. For example, authentication platform 630 may be configured to store information regarding the playing cards, e.g., playing card 610. For example, authentication platform 630 may store item and identifier records. Authentication platform 630 may also store ownership information, e.g., an identifier of a user currently owning, e.g., most recently claimed, a particular playing card.

Shown in FIG. 6 is that mobile scanning device 620 and authentication platform 630 are configured for two protocols. A protocol to verify the authenticity of playing card 610, and a protocol to claim ownership of playing card 610.

Figure 7:
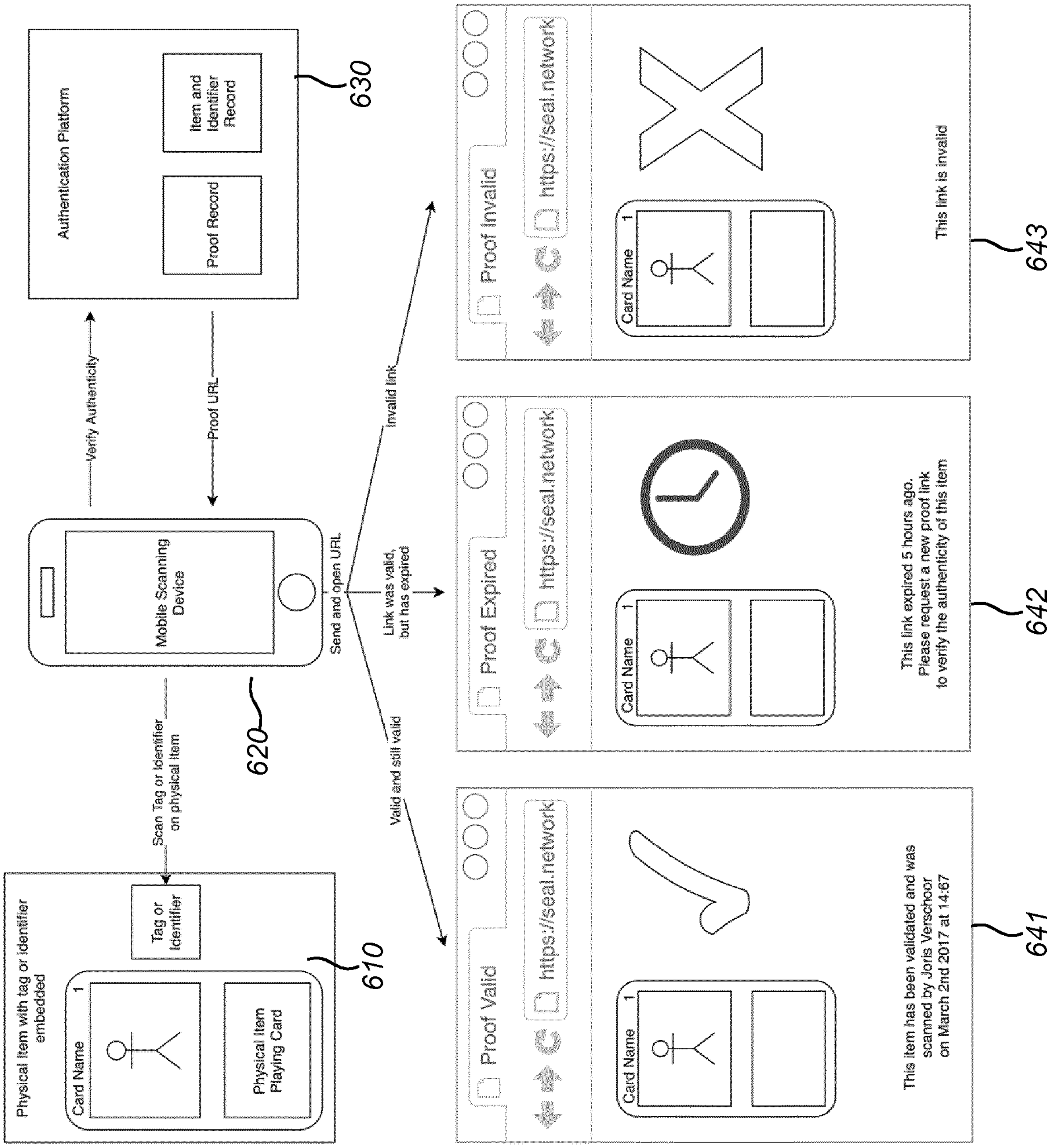

FIG. 7 schematically shows an example of an embodiment of playing card system 600 in further detail in particular an example is shown of an embodiment of the protocol to verify the authenticity of playing card 610. In response to a request from mobile scanning device 620 to verify the authenticity of playing card 610, authentication platform 630 may generate a web-page which may be downloaded from authentication platform 630 by requesting a particular computer network address, e.g., a web-address, e.g., a URL. For example, in response to the request a proof URL may be generated. When visiting the URL, e.g. using a web-browser, the status of the card may be obtained.

Three possible response are shown in FIG. 7. For example, according to web page 641, the page contains the information that the card is authentic, e.g., that it is accounted for in the database of server 630. Additional information may be when the card was validated.

Optionally, a proof link, such as the URL to web page 641 may be valid for a limited amount of time. Although, page 641 shows when the authenticity was last checked, this point may be missed by some consumers, and thus open a window for fraudulent transactions. A proof link according to this option is only valid for a limited amount of time. For example, web page 642 shows that the proof link expired. For example, according to web page 643, the link may be invalid. For example, this page may be shown when the card could not be authenticated.

Accordingly, in this embodiment proof links may be generated, e.g., generation of a, possibly temporary, link, e.g. a URL, based on a scan of the playing card, with which authenticity but also physical access can be proven.

For example, in an embodiment, a user may scan his card with his mobile phone and receive a proof link in return. The proof link, e.g., a URL, may then be forwarded to some else, e.g., through a chat-app, marketplace, or e-mail or the like. For example, one could include the link when referring to the card online such as on a webpage; for example, the link may be included when the card is put up for sale on eBay or the like.

The other user may then verify the information, e.g., the authenticity of the card himself. For example, this may be used during negotiating a sale, or during game play or the like.

In an embodiment, the system is configured for a method to remotely proof the physical possession of a physical item such as a playing card. For example, scan a card and obtain a unique code from the authentication server. The code may be verified on the server. The unique code may include a computer network address, e.g., a URL, although this is not necessary. The unique code or URL may be sent to another party, e.g., a counterparty, another device, or the online marketplace. This token can be checked to prove whether and optionally when someone physically carried the product.

The marketplace is based on ownership registration of authenticated physical items such as playing cards. The marketplace may be implemented as a server or a cloud instance, etc., as an entity to and from one may send messages over a computer network. For example, the marketplace may include a computer. For example, the marketplace may include a web server. The marketplace may be integrated, e.g. included in, the authentication server.

In an embodiment, an online system is provided in which people register items they possess, and which may be verified using an authentication method. In the marketplace, owners may be regarded as potential sellers, as they have items which they might sell if the price or circumstances are right. For example, each time an owner scans or verifies the item, a field may be updated with the last time someone has interacted with it, and at which time the current owner has interacted with it.

Buyers looking to buy a certain type of product can query the server which holds all registered items. The buyer can place a price range and distance in the marketplace. The marketplace will then find potential sellers. The results from the query can be scored based on one or more of the following:

- proximity/distance of the buyer and potential seller,
- the time since last time the potential seller has interacted with the item,
- the time since the first time the potential seller has interacted with the item,
- the time since the first time the potential seller has become the registered owner of the item,
- the number of times the potential seller has responded an offer on an item,
- the number of times the potential seller has accepted an offer on an item,
- the percentage of offers accepted by the potential seller,
- the last time the potential seller has been active on the marketplace, for example by using an app or website,
- if known by the system, the price the potential seller has paid for the item,
- if known by the system, the historic retail price of the item,
- if known by the system, the current retail price of the item,
- if known by the system, the current market price of the item,
- if set, the sell-price the potential seller has set for the item.

The marketplace may add potential sellers to a list. To this list, new potential sellers may be added periodically for as long as the query is active. The buyer can manually indicate interest in a specific seller from those presented in the potential sellers list. The seller may then get a notification, e.g., push notification, email, etc., from the marketplace that someone is interested in buying an item they own. If the seller states he/she is also interested in selling, the buyer and seller can either:

- go into negotiation manually to discuss the state of the item and deal terms or:
- accept the trade and receive information about delivery/shipping and payment.

The marketplace may be configured to automatically find in parallel the highest scored potential sellers and notify interest to them. There can be a maximum number of simultaneous outstanding offers, e.g., configured for parallelism. The list of outstanding offers may periodically be checked for expired offers. If the maximum parallelism is not yet reached, the marketplace will add the next highest scoring offer to the current list.

Upon accepting a trade, the system may update the owner field of the item. From that moment on, the buyer seen as the registered owner of the item.

The marketplace may be configured with a recommender system for digital twins, collectibles, and the like. For example, the market place may be configured with a computer algorithm that analyses user-registered digital twins from owners of physical items from a database or subset of digital twins and owners, to detect latent or non-latent class membership of the object in order to recommend other objects, such as playing cards, that must or should be acquired in order to complete a manifest set of objects, such as a deck list or a game's expansion set, or a latent class, such as synergistic cards that are frequently associated with each other. An example of a latent class would be "Brainstorm" and "Fetchlands", although they are not directly related to each other, owners of "Fetchlands" would benefit from acquiring "Brainstorm" which is a well-known synergy in the card game Magic: the Gathering. The recommender system quantifies other non-obvious synergies. The detected item-associations are mapped to the related items in a database and are recommended to the user if he/she already owns part of the set. The greater the ownership share of the set, the higher the card is ranked in order of recommendations.

Figure 8A:
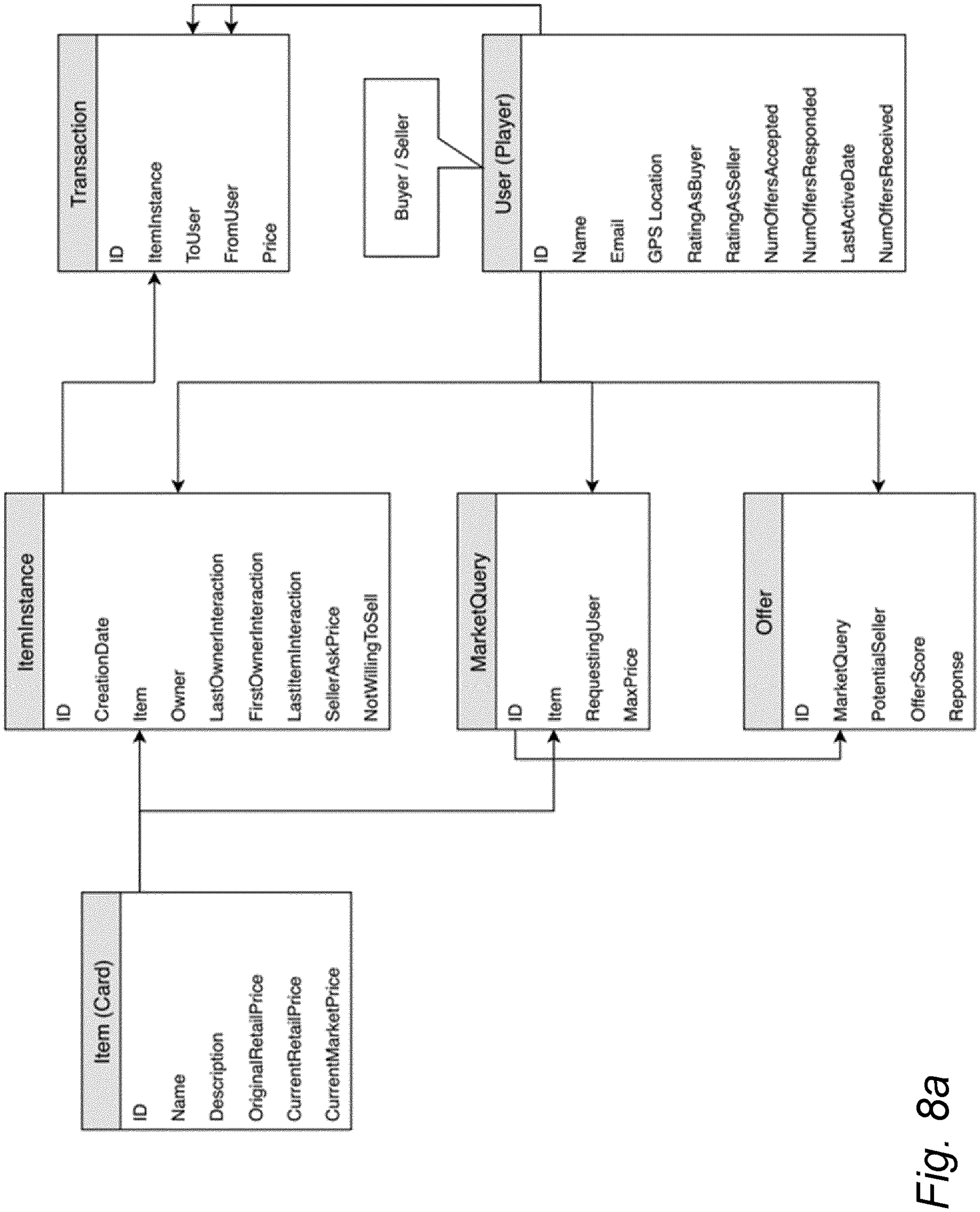
Figure 8B:
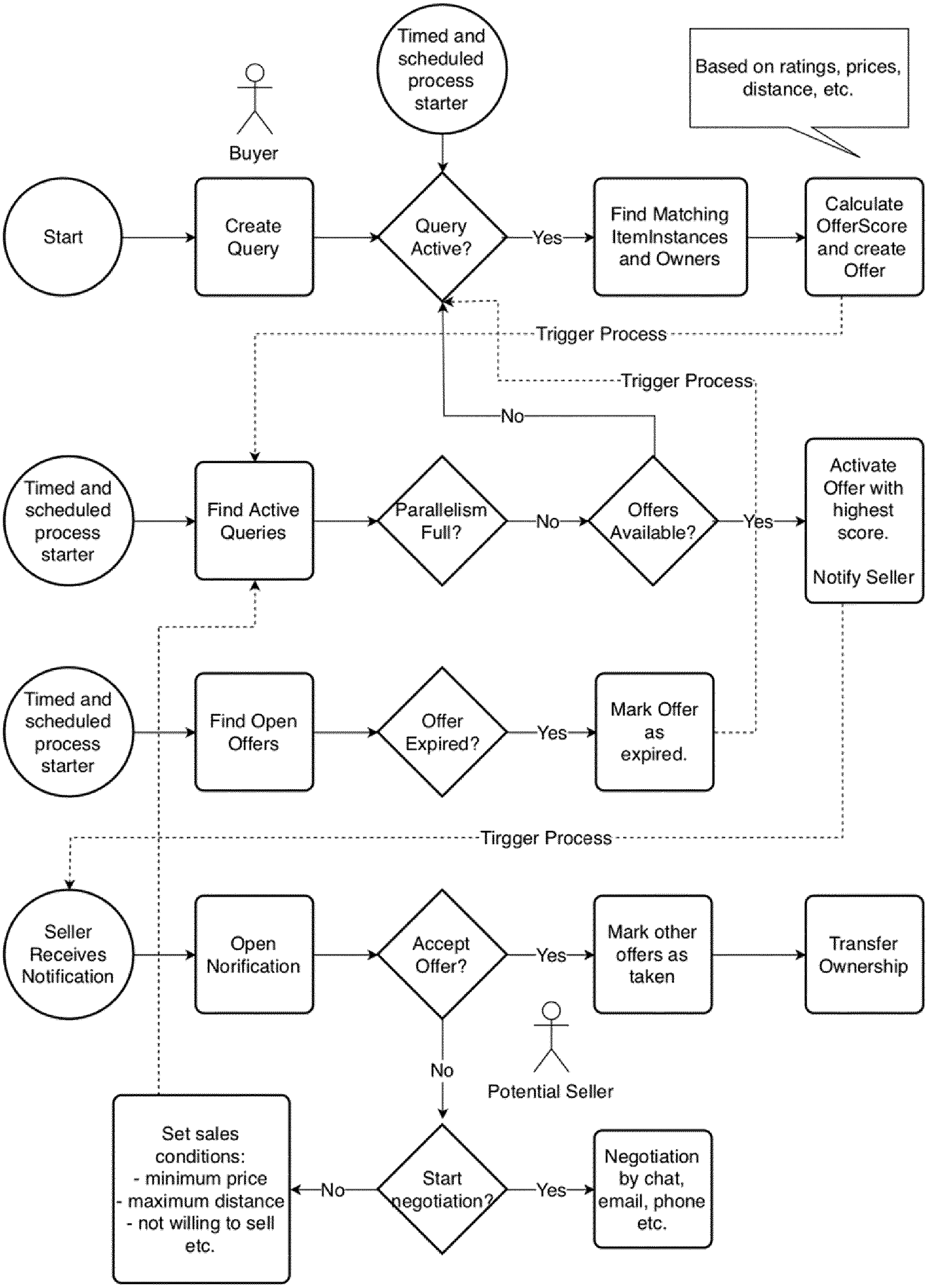

FIG. 8*a* schematically shows an example of a data model of an embodiment of a marketplace application. FIG. 8*b* schematically shows an example of a process diagram of an embodiment of the marketplace application. Interestingly, because items have an owner, the marketplace application has information that indicates who owns a particular card. The marketplace allows a prospective buyer of a card to ask owners of if they want to sell it.

For example, scoring may be done based on the information indicated in FIG. 8*a*, but also on location, e.g., GPS location, e.g., distance, and a user rating as a buyer and/or seller. The list of items that are available, with their score, may be saved. Potential sellers may be notified in parallel, e.g., with a maximum, e.g., max 5 at a time. These offerings can be accepted, rejected, a negotiation can be started, or they can expire, etc. The list of active orders may be updated each time it does not reach the max parallelism.

FIG. 8*b* shows an example the process of searching, matching and executing a trade on embodiment of the marketplace application. In an embodiment, the marketplace application maintains an active query queue. For example, a buyer may start by creating a query on the marketplace. The query may be added to a list of active queried in the marketplace, e.g., the active query queue. The active query queue may be executed periodically and/or as a response to adding a query to the queue, and/or using a job queue runner. The active query may be executed against the system using parameters which may be set by the user, e.g., based on, e.g., card, distance, price, etc. For example, each result may get a score and may be added as an Offer linked to the query.

Offers with the highest score added to a query may be activated and presented to the owner of the item associated with the offer. This person or entity is called a potential seller. For example, this can be preformed by a different process, which may be executed periodically, as a response to adding an offer to a query, as a response to decline another offer, and/or using a job queue runner, etc. In an embodiment, the maximum number of simultaneously active offers can be limited, e.g., in order to reduce the number of fulfilled/accepted orders still presented to the potential sellers. If a potential seller receives too many offers he is not able to accept due to the fact that it was already accepted by someone else, it is likely that the potential seller will deem the notifications as less valuable and may not even respond to offers at all because of disappointment.

When an offer is activated, a notification is sent to the potential seller. This notification may be in the form of a push notification, email, SMS, etc. The potential seller can open the offer in the marketplace using an app or web application. The potential seller may have various options to respond to this offer. For example, his options may include one or more of:

The potential seller can accept the offer. The ownership of the item may be transferred directly or when the payment has been confirmed, depending on the terms used for the transaction. If the buyer has pre-paid for the item, or when the buyer's payment details are known, or when the buyer has enough credits in his account, the payment confirmation may be done immediately.

The potential seller may decline the offer and set conditions about when he would be interested in selling. This may be a minimum price, distance, or not for sale at all. This information will then be used in future queries.

The potential seller can open a negotiation. This is not a permanent outcome but will allow both parties to establish terms and conditions and then either accept or reject the offer.

If the potential seller does not respond within a set amount of time, the offer may be marked as "expired". The ratio or number of expired offers may be used for better matching in the future. If another potential seller has accepted an offer of a query, all other offers of that query may be marked as "taken". This status does not penalize the potential seller in the matching and scoring algorithm.

If the buyer decides to cancel his query, all open offers will be marked as "cancelled". This status does not penalize the potential seller but can penalize the buyer in the matching and scoring algorithm. An example may be limiting the number of simultaneously open offers for a query.

Figure 9A:
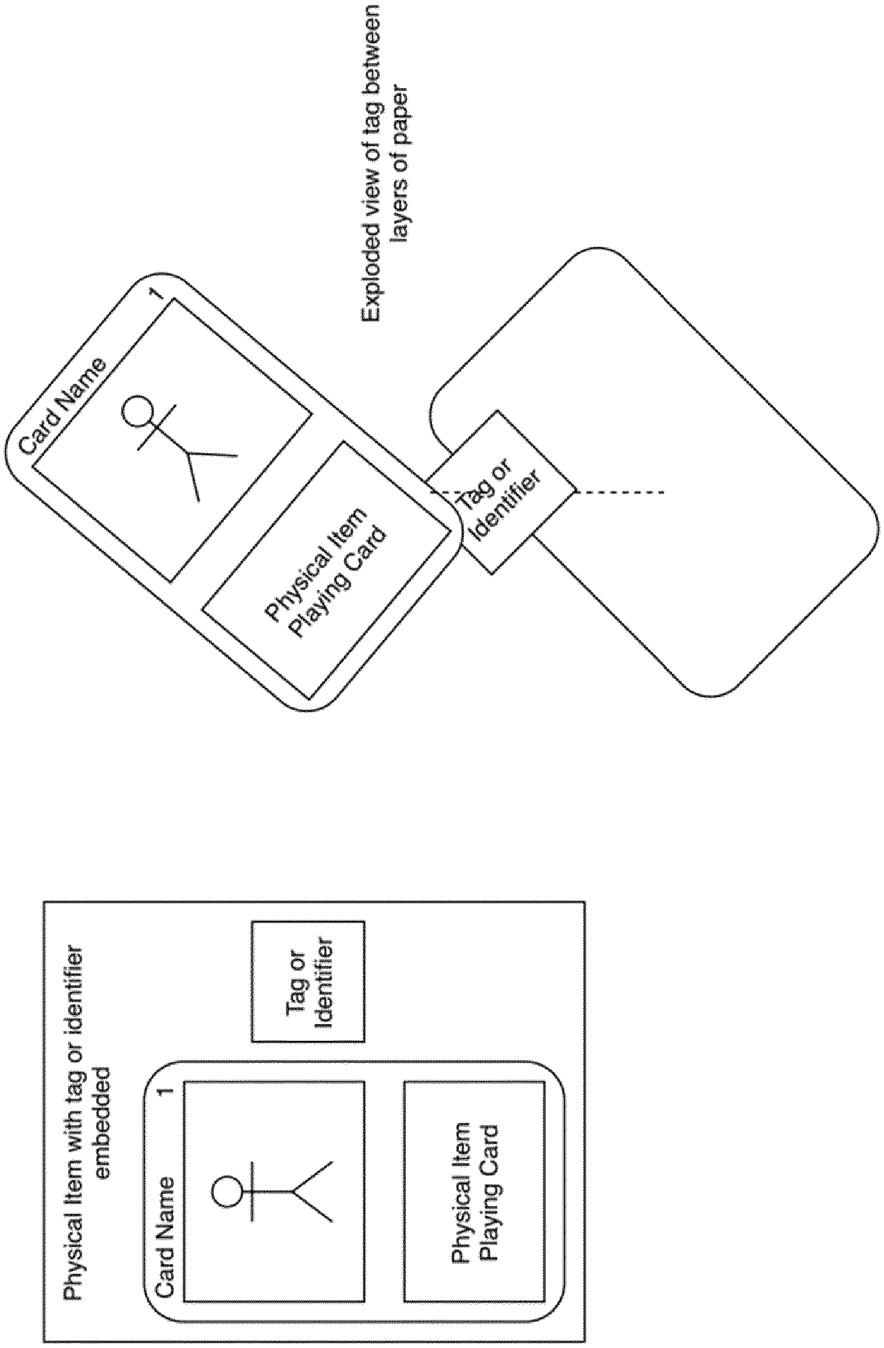

FIG. 9*a* schematically shows an example of an embodiment of a playing card. For example, the tag may be embedded in the card.

Figure 9B:
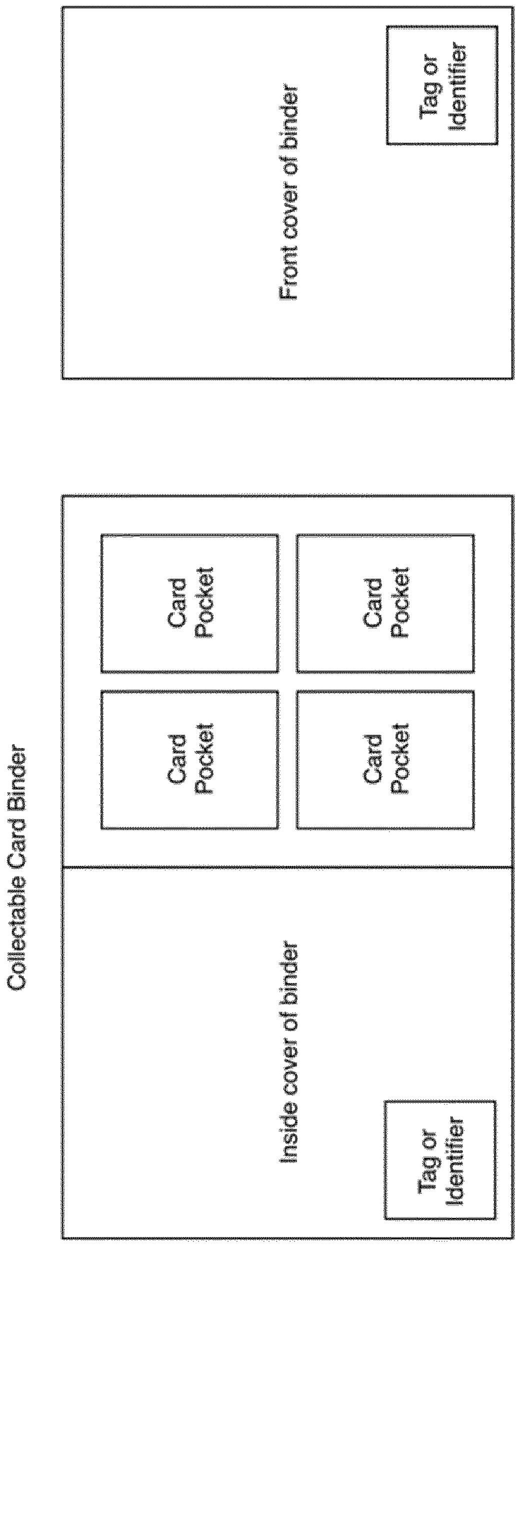
Figure 10:
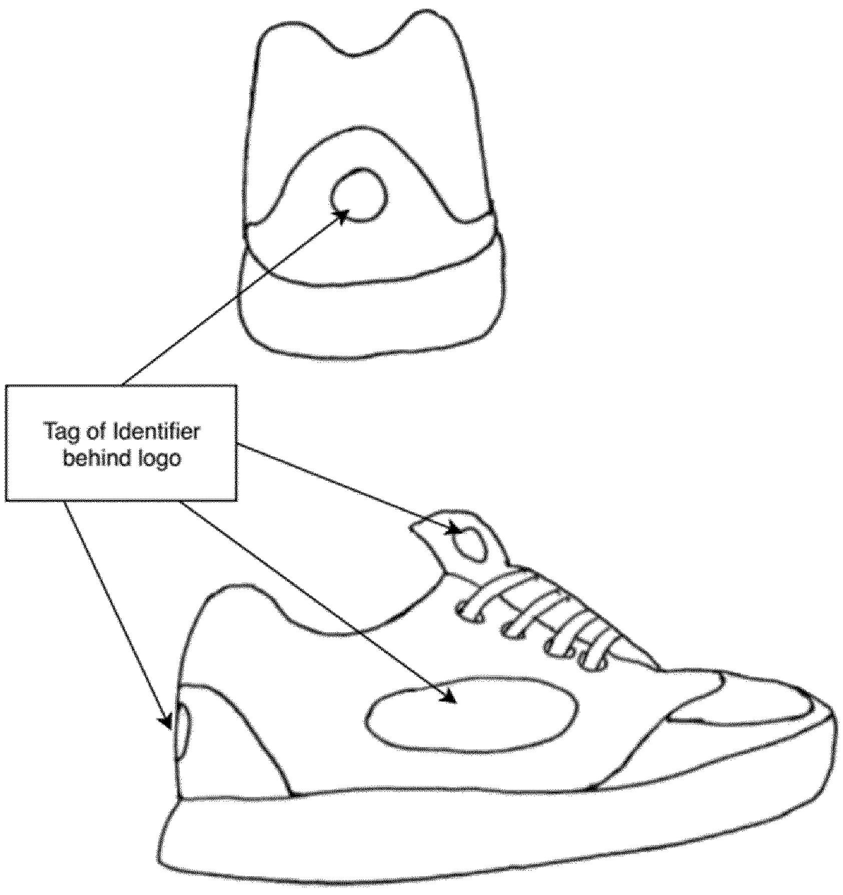

The technology described herein for playing card may also be applied to other physical objects. FIG. 9*b* schematically shows an example of an embodiment of a card binder. For example, a tag like the one used in a playing card may be embedded in a cover, e.g., a front cover or inside cover, etc. This allows the verification or transferring of card binders. Using the same technology, one could scan a folder. FIG. 10 schematically shows an example of an embodiment of a shoe, in this case a sneaker, with a tag embedded therein. All the embodiments discussed for playing cards could be modified to sneakers or binders.

It should be noted that the above-mentioned embodiments illustrate rather than limit the presently disclosed subject matter, and that those of ordinary skill in the art will be able to design many alternative embodiments.

In the claims, any reference signs placed between parentheses shall not be construed as limiting the claim. Use of the verb 'include' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by means of hardware including several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims, references in parentheses refer to reference signs in drawings of exemplifying embodiments or to formulas of embodiments, thus increasing the intelligibility of the claim. These references shall not be construed as limiting the claim.

The invention claimed is:

1. A playing card system configured to authenticate a playing card for playing a card game, the playing card system comprising a playing card, a playing card authentication device, and a playing card authentication server, wherein the playing card comprises an electronic memory storing authentication data, and a counter, wherein the authentication data stored in the playing card comprises a private key of a public/private key pair, and/or a symmetric key, an antenna configured for wireless communication, a processing circuit configured to wirelessly receive a digital command over the antenna from the electronic playing card authentication device, create an authentication token in response to receiving an authentication command, the creating comprising reading the authentication data and the counter from the memory and applying a cryptographic function thereto, wirelessly transmit the authentication token to the device through the antenna, and increase the counter stored in the memory, the playing card authentication device is configured for verifying the authenticity of the playing card, the playing card authentication device comprises a communication unit configured to communicate over a computer network to the playing card authentication server, an antenna configured for wireless communication with the playing card, a processing circuit configured to wirelessly send a digital authentication command over the antenna to the playing card, receive from the playing card an authentication token in response to the digital authentication command, send the authentication token to the authentication server through the communication unit, and receive from the authentication server information on the authenticity of the playing card, the playing card authentication server is configured for verifying the authenticity of the playing card, the playing card authentication server comprises an electronic memory for storing authentication data and a counter, wherein the authentication data stored in the playing card authentication server comprises the public key of the public/private key pair, and/or a symmetric key, a communication unit configured to communicate over the computer network with the playing card authentication device, a processing circuit configured to receive from the playing card authentication device the authentication token, verify the authentication token with the counter and authentication data stored in the memory of the playing card authentication server, and if the verification succeeded, sending information indicating the authenticity to the playing card authentication device, and increase the counter in the memory of the playing card authentication server.

2. A playing card configured for playing a card game, the playing card comprising:

an electronic memory storing authentication data, and a counter, wherein the authentication data stored in the playing card comprises a private key of a public/private key pair, and/or a symmetric key, an antenna configured for wireless communication, a processing circuit configured to wirelessly receive a digital command over the antenna from an electronic playing card authentication device, create an authentication token in response to receiving an authentication command, the creating comprising reading the authentication data and the counter from the memory and applying a cryptographic function thereto, and wirelessly transmit the authentication token to the device through the antenna, increase the counter stored in the memory.

3. The playing card as in claim 2, wherein the processor circuit of the playing card is configured to receive the new authentication data over the antenna and write the new authentication data to the memory.

4. The playing card as in claim 3, wherein the memory comprises at least two areas for storing authentication data, the processor of the card being configured to write the authentication data to the memory to a different area than the area storing the authentication data used to generate the authentication token.

5. The playing card as in claim 2, wherein the memory of the playing card comprises a playing card identifier, the authentication token comprising the playing card identifier.

6. The playing card as in claim 2, wherein the antenna is configured for NFC communication.

7. The playing card as in claim 2 wrapped in a foil, wherein the foil is a metallic foil or is lined with a metallic material to attenuate the wireless signal to and from the antenna.

8. A playing card pack comprising one or more playing cards as in claim 2, the pack comprising a further card, the further card comprising an antenna configured for wireless communication and a processing circuit configured to distort the wireless signal of the one or more playing card.

9. A playing card authentication device for verifying the authenticity of a playing card, the playing card authentication device comprising a communication unit configured to communicate over a computer network to a playing card authentication server, an antenna configured for wireless communication with a playing card, a processing circuit configured to wirelessly send a digital authentication command over the antenna to the playing card, receive from the playing card an authentication token in response to the digital authentication command, send the authentication token to the authentication server through the communication unit, and receive from the authentication server information on the authenticity of the playing card.

10. The playing card authentication device as in claim 9, wherein the playing card authentication device is configured to authenticate the playing card authentication server.

11. The playing card authentication device as in claim 9, wherein the playing card authentication server is configured to send information regarding the playing card for display on the playing card authentication device.

12. The playing card authentication device as in claim 9, wherein the memory comprises a game parameter for the playing card, the game parameter being modified upon receiving an authentication token which correctly verifies, the game parameter being sent with the information indicating the authenticity.

13. The playing card authentication device as in claim 9, wherein the authentication data stored in the playing card is a private key of a public/private key pair, and the authentication data stored in the playing card authentication server is the public key of the public/private key pair, or the authentication data stored in the playing card is a symmetric key, and the authentication data stored in the playing card authentication server is the same symmetric key.

14. The playing card authentication device as in claim 9, wherein the processor circuit of the playing card authentication device is configured to receive the new authentication data over the communication unit, and send the new authentication data to the playing card over the antenna.

15. The playing card authentication device as in claim 9, wherein the memory of the playing card comprises a playing card identifier, the authentication token comprising the playing card identifier.

16. A playing card authentication server for verifying the authenticity of a playing card, the playing card authentication server comprising:

an electronic memory for storing authentication data and a counter, wherein the authentication data stored in the playing card authentication server comprises the public key of the public/private key pair, and/or a symmetric key, a communication unit configured to communicate over a computer network with a playing card authentication device, a processing circuit configured to receive from the playing card authentication device an authentication token, verify the authentication token with the counter and authentication data stored in the memory of the playing card authentication server, and if the verification succeeded, sending information indicating the authenticity to the playing card authentication device, and increase the counter in the memory of the playing card authentication server.

17. The playing card authentication server as in claim 16, wherein the processing circuit is configured to generate an information page, e.g., a web page, comprising the result of verifying the authentication token, generate an identifier, e.g., a computer network address, through which the information page is accessible over a computer network, making the identifier available to the playing card authentication device.

18. The playing card authentication server as in claim 16, wherein the memory comprises a user identifier which identifies a user of a further service of the playing card authentication server, the playing card authentication device sending the user identifier with the authentication token, the playing card authentication server being configured to associate the user identifier with the playing card identifier in the memory of the playing card authentication server, the playing card authentication server being configured to provide access to the playing card in the further service.

19. The playing card authentication server as in claim 16, configured to generate a blockchain transaction comprising the playing card identifier, transmitting the blockchain transaction to a blockchain network so that the transaction is processed by a blockchain management device for including in a block on the blockchain.

20. The playing card authentication server as in claim 16, comprising a database storing cards that have been authenticated for a user, a digital game play interface configured to receive a game play instruction referencing a card of the user, the playing card authentication server being configured to to verify that the referenced card has been authenticated for the user before allowing processing the game play instruction.

21. The playing card authentication server as in claim 16, wherein the authentication data stored in the playing card is a private key of a public/private key pair, and the authentication data stored in the playing card authentication server is the public key of the public/private key pair, or the authentication data stored in the playing card is a symmetric key, and the authentication data stored in the playing card authentication server is the same symmetric key.

22. The playing card authentication server as in claim 16, wherein the playing card authentication device is configured to authenticate the playing card authentication server.

23. The playing card authentication server as in claim 16, wherein the processor circuit of the playing card authentication server is configured to generate a new authentication data, if the verification succeeded, send the new authentication data to the playing card authentication device.

24. The playing card authentication server as in claim 16, wherein the memory of the playing card comprises a playing card identifier, the authentication token comprising the playing card identifier.

25. The playing card authentication server as in claim 16, wherein the playing card authentication server is configured to send information regarding the playing card for display on the playing card authentication device.

26. The playing card authentication server as in claim 16, wherein the memory comprises a game parameter for the playing card, the game parameter being modified upon receiving an authentication token which correctly verifies, the game parameter being sent with the information indicating the authenticity.

27. A playing card authentication method to authenticate an electronic playing card, the method comprising:

wirelessly sending a digital command over an antenna to the playing card to cause the playing card to create an authentication token, the playing card comprising an electronic memory storing authentication data, and a counter, creating the authentication token comprises applying a cryptographic function to the authentication data and the counter, wherein the authentication data stored in the playing card comprises a private key of a public/private key pair, and/or a symmetric key, wirelessly receiving the authentication token from the device through the antenna, having the authentication token verified with the counter and authentication data stored in the memory of a playing card authentication server, wherein the authentication data stored in the playing card authentication server comprises the public key of the public/private key pair, and/or a symmetric key.

28. A computer readable medium comprising transitory or non-transitory data representing instructions to cause a processor system to perform the method according to claim 27.

29. A authentication system configured to authenticate a physical object, the authentication system comprising a physical object, a physical object authentication device, and a physical object authentication server, wherein the physical object comprises an electronic memory storing authentication data, and a counter, wherein the authentication data stored in the physical object comprises a private key of a public/private key pair, and/or a symmetric key, an antenna configured for wireless communication, a processing circuit configured to wirelessly receive a digital command over the antenna from the electronic physical object authentication device, create an authentication token in response to receiving an authentication command, the creating comprising reading the authentication data and the counter from the memory and applying a cryptographic function thereto, wirelessly transmit the authentication token to the device through the antenna, and increase the counter stored in the memory, the physical object authentication device is configured for verifying the authenticity of the physical object, the physical object authentication device comprises a communication unit configured to communicate over a computer network to the physical object authentication server, an antenna configured for wireless communication with the physical object, a processing circuit configured to wirelessly send a digital authentication command over the antenna to the physical object, receive from the physical object an authentication token in response to the digital authentication command, send the authentication token to the authentication server through the communication unit, and receive from the authentication server information on the authenticity of the physical object, the physical object authentication server is configured for verifying the authenticity of the physical object, the physical object authentication server comprises an electronic memory for storing authentication data and a counter, wherein the authentication data stored in the physical object authentication server comprises the public key of the public/private key pair, and/or a symmetric key, a communication unit configured to communicate over the computer network with the physical object authentication device, a processing circuit configured to receive from the physical object authentication device the authentication token, verify the authentication token with the counter and authentication data stored in the memory of the physical object authentication server, and if the verification succeeded, sending information indicating the authenticity to the physical object authentication device, and increase the counter in the memory of the physical object authentication server.

* * * * *